July 1, 1947.    R. J. WATROBSKI    2,423,357
METHOD OF DETERMINING THE OPTICAL AXIS OF A QUARTZ CRYSTAL
Filed Jan. 13, 1942
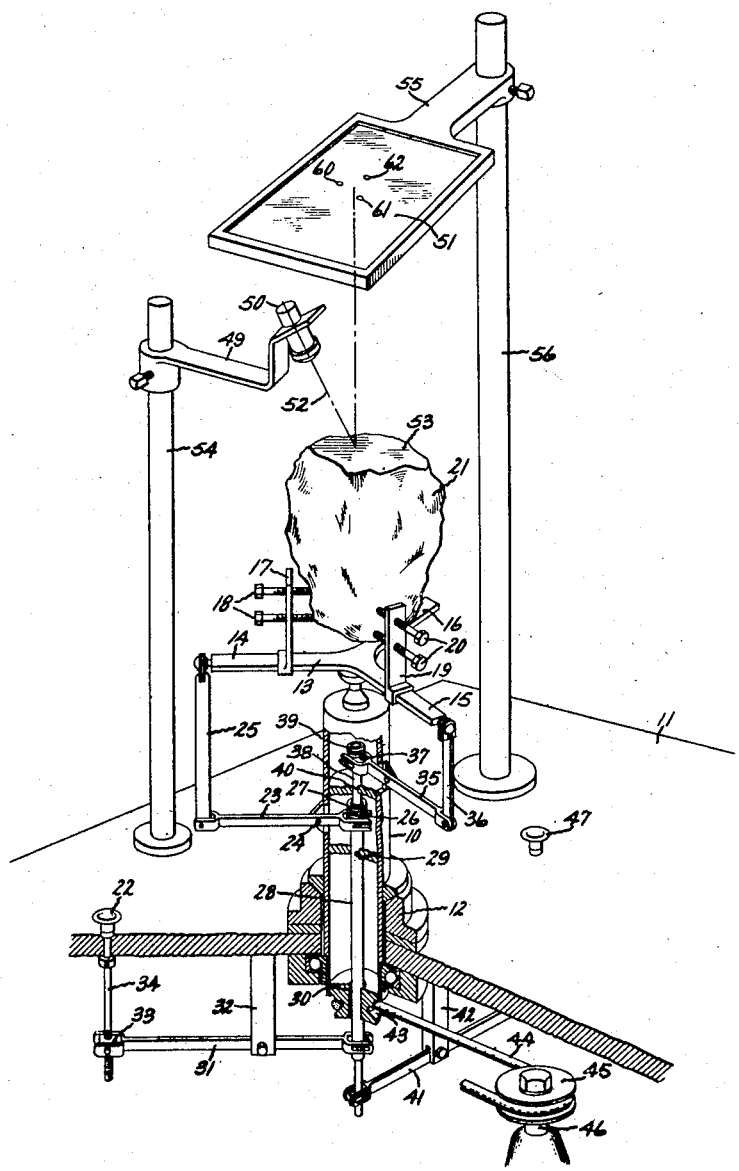
Inventor:
Raymond J. Watrobski,
by Harry E. Dunham
His Attorney.

Patented July 1, 1947

2,423,357

UNITED STATES PATENT OFFICE 2,423,357

METHOD OF DETERMINING THE OPTICAL AXES OF QUARTZ CRYSTALS

Raymond J. Watrobski, Schenectady, N. Y., assignor to General Electric Company, a corporation of New York Application January 13, 1942, Serial No. 426,640

4 Claims. (Cl. 88—14)

My invention relates to crystals, and more particularly to a method for determining the optical axis of crystals.

Quartz crystals, as they occur in nature, have a typically crystalline form, which may be described as a hexagonal prism terminated at each end by structures which are roughly in the form of hexagonal pyramids. The roughly pyramidal end structures of the hexagonal prism have three major and three minor faces, and make the crystal trigonally symmetrical. The axis of trigonal symmetry is approximately parallel to the fixed edges of the hexagonal prism, and is called the optical axis of the quartz crystal, because quartz possesses the property of rotating the plane of polarization of plane polarized light traversing the crystal parallel to this axis.

Quartz crystals possess two other sets of characteristic axes, both of which are perpendicular to the optical axis. One set of such axes is called mechanical, while the other set is called electric. Each mechanical axis is approximately perpendicular to two opposite faces of the hexagonal prism. Each electric axis is perpendicular to the optical axis and to a mechanical axis.

The electrical and other characteristics of pieces of quartz cut from such quartz crystals depend primarily on the orientation of the cutting planes with respect to the optical, electric and mechanical axes of the crystal. In order, therefore, to cut quartz crystals into satisfactory pieces, it is necessary to know accurately at least two of the characteristic axes, the third being readily determinable thereafter.

It is accordingly an object of my invention to provide a new and improved method for determining more readily the optical axis of a crystal.

Most high quality quartz crystals, particularly those suitable for use in making piezoelectric vibrators, are of irregular shape as purchased in commercial channels. A small portion of such crystals is river quartz, whose outer surfaces have been worn away by tumbling in a river bed, so that the hexagonal shape of the crystal is discernible with great difficulty, if at all.

Most commercial quartz crystals are mutilated in mining operations, since the outer surface is usually not clear. Only clear quartz is usable for piezoelectric vibrators, so that in the mining operation the outer surfaces are usually chipped away to determine whether the core is clear. It is obvious that the naturally hexagonal shape of the crystals is mutilated by such chipping.

It is difficult to tell precisely where the optical axis of a perfect quartz crystal is, and it is obviously more difficult to determine such optical axis for river quartz or mutilated quartz as described above. It is accordingly a further object of my invention to provide a new and improved method for determining readily the optical axis of a crystal even though its characteristic outer surface has been mutilated or worn away.

It is also an object of my invention to provide such a method which does not depend upon the use of polarized light, and which is capable of greater accuracy in the determination of the optical axis than methods utilizing polarized light.

It is still another object of my invention to provide such a method which is particularly useful for determining the optical axis of a quartz crystal.

The features of my invention which I believe to be novel are set forth with particularity in the appended claims. My invention itself, both as to its organization and manner of operation, together with further objects and advantages thereof may best be understood by reference to the following description taken in connection with the accompanying drawing in which the single figure is a perspective view, partly in section, of apparatus suitable for use in connection with my invention.

In the figure a hollow cylindrical shaft 10 is supported vertically through a workbench, or table, 11 by a bearing, generally designated 12, which is so arranged as to allow the shaft 10 to rotate about its vertical axis. Mounted on the upper end of the shaft 10 on a swivel joint allowing limited rotational motion in any direction is a support 13 having three arms 14, 15 and 16 extending outwardly from a point above the upper end of the shaft 10. A slidable bracket 17 carrying two clamping screws 18 is mounted to slide along the arm 14, and a similar bracket 19 carrying two clamping screws 20 is similarly arranged to slide along the arm 15. A third slidable bracket, not shown, is arranged on the arm 16.

The three brackets, 17, 19 and the one not shown, are so arranged as to be capable of maintaining an irregularly shaped body, such as the piece 21 of quartz crystal, mounted in a fixed position with respect to the support 13. The support 13 is so arranged with respect to the vertical shaft 10 that it not only rotates with the shaft 10 but also allows adjustment of the angles between the arms 14 and 15 and the axis of the shaft 10. The arms 14 and 15 lie in angularly displaced planes passing through the shaft 10 and are angularly adjustable with respect to the shaft so that the irregularly shaped body 21 may be oriented in any desired manner with respect to the axis of the shaft 10.

The adjustment of the angle between the arm 14 and the axis of the shaft 10 is produced by adjustment of the control knob 22, whether the shaft 10, the support 13 and the crystal 21 are rotating or not. The linkage connecting the control knob 22 and the arm 14 includes a lever 23 mounted on a pivot 24 near the surface of the hollow cylindrical shaft 10 for rotation about an axis perpendicular to the axis of the shaft 10. The outer end of the lever 23 is maintained at a fixed distance from the outer end of the arm 14 by a link 25, pivotally connected respectively to the link 23 and the arm 14. The end of the lever 23 within the shaft 10 is fork-shaped, and is pivotally connected with a bushing 26 connected through a bearing 27 to the upper end of a hollow shaft 28. The bearing 27 allows rotational movement between the shaft 28 and the bushing 26, but prevents any axial movement of the bushing 26 along the shaft 28.

The hollow shaft 28 is concentric with the hollow shaft 10, and is mounted in bearings 29 and 30 within the shaft 10 to allow the shaft 28 to be moved axially with respect to the shaft 10, or to allow rotational movement therebetween. The lower end of the shaft 28 is pivotally connected to a lever 31 which is pivotally supported from the table 11 on a support 32. The opposite end of the lever 31 is directly beneath the control knob 22, and is pivotally connected to a screw-threaded block 33 carried by a threaded shaft 34 attached to the control knob 22.

Rotation of the control knob 22 in a clockwise direction moves the block 33 upward and, through the medium of the lever 31 moves the hollow shaft 28 downward. Such movement of the shaft 28 moves the forked end of the lever 23 downward through the medium of the bearing 27, regardless of rotation of the shaft 10 and lever 23 around the axis of the shaft 10. When the forked end of the lever 23 moves down, its outer end moves up, and through the link 25, moves the outer end of the arm 14 upward.

For accurate work all bearings and connections in the linkage described should be carefully made and adjusted to have a minimum amount of play. This is necessary in order that the orientation of the irregularly shaped body 21 may be adjusted within small limits, and so that such adjustment shall be maintained regardless of rotation of the body.

A similar linkage is provided to move the outer end of the arm 15 upward when a second control knob 47 is turned in a clockwise direction. This linkage includes a second lever 35 pivotally mounted near the surface of the hollow shaft 10 for rotation about an axis perpendicular to the axis of the shaft 10. The outer end of the lever 35 is maintained at a constant distance from the outer end of the arm 15 by means of a link 36, pivotally connected at its ends to the lever 35 and the arm 15.

The inner end of the lever 35 is forked, and is pivotally connected to a bushing 37 which is constrained against axial movement with respect to a shaft 38 by means of a bearing 39. The bearing 39 is so arranged as to allow the bushing 37 and the shaft 38 to rotate with respect to one another.

The shaft 38 is arranged so that it may rotate within the shaft 10 by means of a bearing 40 in the shaft 10 and a second bearing comprising the inner surface of the hollow shaft 28. The shaft 38 extends downward through the hollow shaft 28, and is pivotally connected to a lever 41 which is pivotally supported on the table 11 by a support 42. The other end of the lever 41 is connected with the control knob 47 in a manner similar to the connection between the lever 31 and the control knob 22.

It is convenient to provide a motor drive for maintaining constant rotation of the body 21. Such a drive may be provided by means of a pulley 43 formed on the lower end of the shaft 10 beneath the table 11. This pulley 43 is rotated by means of a belt 44 driven from a pulley 45 on a driving shaft 46. The shaft 10 may conveniently be arranged to rotate at relatively slow speed, for example, a speed in the order of 10 to 100 R. P. M.

The arrangement described is particularly useful for rotating a quartz crystal and for orienting it about its axis of rotation during rotation thereof until its optical axis coincides with its axis of rotation. In order to determine when its optical axis coincides with its axis of rotation, light is utilized, and I provide a light source 50 and a ground glass light receiving screen 51, to be used in a manner to be explained later. The light source 50 may conveniently be any small incandescent lamp energized from a suitable source and mounted in a holder with a collimating lens, in such a way as to project a beam 52 of light upon an upper surface 53 of the quartz crystal 21 at a suitable angle. Ideally, the light beam 52 is coincident with the axis of rotation of the shaft 10 so that the reflected beam retraces the same path, or is displaced at only a slight angle in the event that it is found necessary to adjust the crystal so that the surface 53 is slightly oblique to the shaft axis. Such an arrangement, while possible, is difficult of attainment, and in the preferred embodiment of the invention shown in the drawing, the direct beam 52 and the reflected beam are each at an angle of about 15° with the axis of the shaft 10, so that the physical structure of the light source 50 does not intercept the reflected beam.

In order to hold the source 50 of light in a suitable position, and at such an angle, a bracket 49, adjustably mounted on a post 54 fixed to the table 11 may be provided.

It is preferred that the ground glass light receiving screen 51 be positioned directly above the upper surface 53 of the quartz crystal 21, and it may be so positioned by being mounted on a bracket 55 fastened to a post 56 fixed on the table 11. The brackets 49 and 55 are fastened respectively to the posts 54 and 56 by adjustable means so that they may be placed respectively at any desired height above the crystal 21.

In carrying out the method of my invention a crystal whose optical axis is to be determined with high accuracy is first examined with polarized light to determine roughly in what direction its optical axis lies. After such rough determination, a face 53 of the crystal 21, perpendicular to such roughly determined optical axis, is cut away to form a fairly smooth surface. It should be understood that this rough determination of the optical axis by means of polarized light is not necessary, but does usually make it unnecessary to cut more than one face 53 on the quartz crystal 21.

After the face 53 is cut or ground on the crystal 21, if the crystal is quartz, it is etched in 48% hydrofluoric acid for about eight hours. It is believed that this etching is most effective in dissolving the structure of a quartz crystal 21 where there is no plane of crystal cleavage, with the result that irregularly shaped pieces of crystal near the surface 53 are removed, leaving only small regularly shaped crystalline elements. These regularly shaped crystal elements are all oriented in the same direction, and bear a definite relation to the orientation of the optical axis of the crystal as a whole. These small crystal elements are generally of pyramidal shape and reflect light in a unique pattern.

If the crystal 21 is of material other than quartz, the etching should be done by some other suitable solvent for the particular crystal material. Such suitable solvent should be effective to etch the surface of the particular crystal and leave its elemental crystal structure exposed. Any crystal so etched reflects light in a characteristic pattern.

After the face 53 of the crystal 21 is so etched, the crystal is mounted as explained previously on the support 13, with the face 53 substantially horizontal. When the source 50 of light is energized, to project the beam 52 of light on the surface 53 of the crystal 21, such light is reflected from the surface 53 and, if the crystal is quartz, appears on the ground glass 51 as three spots of light 60, 61 and 62. These three spots of light may be regarded as situated at the apices of a triangle. If the beam of light 52 impinging on the surface 53 were pendicular thereto, the three spots of light 60, 61 and 62 would be situated at the apices of an equilateral triangle. When the beam 52 impinges at some large angle, near 90° to the surface 53, the three spots 60, 61 and 62 of light form a triangle of which one side is slightly shortened, but the triangle is still essentially an equilateral triangle. It has been found that an angle of 15°, suggested above, between the beam 52 of light and a perpendicular to the surface 53, produces spots 60, 61 and 62 of light which form an approximately equilateral triangle.

Now, to determine the optical axis, the crystal 21 is rotated by such means as previously described, or otherwise, about the vertical axis perpendicular to the frosted glass 51, and the light pattern, such as the spots 60, 61 and 62 for quartz, rotates about a point. So long as the optical axis of the crystal 21 does not coincide with its axis of rotation, the point about which the pattern rotates does not coincide with the center of the pattern. The control knobs 22 and 47 are then adjusted, thereby changing the orientation of the crystal about its rotational axis, until the optical axis coincides with such axis, at which time, if the crystal is rotational axis, at which time, if the crystal is the quartz, the spots 60, 61 and 62 rotate about the center of the triangle formed thereby.

While it has been specified that 48% hydrofluoric acid may be used to etch the face 53 of a quartz crystal 21, either weaker or stronger solutions of the acid may be utilized, the time of etching being correspondingly increased or decreased. If the etching of quartz is shallow, only the three dots 60, 61 and 62 of light, as described above, may be seen. If the etching is carried out as described previously, with 48% hydrofluoric acid for about eight hours, generally three additional faint dots of light may be seen forming an equilateral triangle reversed 180° from that formed by the dots 60, 61 and 62. The amount of etching required before these three additional faint dots may be seen depends on the particular structure of the crystal being examined.

These three faint dots of light, when seen clearly, have comet-like tails of light associated therewith, each tail facing outward from the center of the pattern and being an extension of one side of the equilateral triangle formed by the faint dots. The sides of both equilateral triangles, and the comet-like tails of the faint dots, lie approximately in the direction of the electric axes of the crystal. The comet-like tails of the faint dots lie toward the negative direction along the electrical axes. The faces of the crystal are approximately parallel to the sides of the two equilateral triangles.

The three primary dots are usually about ¼ inch in diameter when the frosted glass is about 6 inches from the upper surface 53 of the crystal 21. The pattern as a whole in such case has a diameter of about one inch. If the crystal 21 be kept stationary and the beam 52 of light be moved over the surface 53, twinning is revealed, when the beam 52 of light passes between dextrorotatory and levorotatory portions of the crystal, by a sudden reversal of the light pattern on the frosted screen 51. In this reversal the three primary dots 60, 61 and 62 take the place of the three faint dots with the comet-like tails, and the three faint dots take the place of the three primary dots.

"Twinning" exists when a crystal has two portions, one of which is dextrorotatory, or capable of rotating the plane of polarization of light in one direction, and the other portion of which is levorotatory, or capable of rotating the plane of polarization of light in the other direction.

As set forth above, crystals other than quartz, when suitably etched, reflect light to form characteristic patterns. The optical axis of such crystals may be determined in a manner similar to that of quartz crystals, by projecting a beam of light on the etched face so that a reflected light pattern is formed, and determining the axis about which the crystal may be rotated to cause such reflected light pattern to rotate about its center. When the reflected light pattern rotates about its center, the axis of rotation coincides with the optical axis of the crystal. When I use the term crystal herein, I do not intend to include metallic conducting bodies. Such bodies cannot have an optical axis.

While I have shown and described a particular embodiment of my invention, it will be obvious to those skilled in the art that changes and modifications may be made without departing from my invention in its broader aspects.

What I claim as new and desire to secure by Letters Patent of the United States is:

1. The method of determining the optical axis of a quartz crystal which comprises determining such optical axis roughly by means of polarized light, forming a plane surface on said crystal perpendicular to such roughly determined optical axis, etching said plane surface, projecting a beam of light on said surface at a small angle from the perpendicular to said surface for reflection from said surface to produce a light pattern, rotating said crystal about an axis substantially perpendicular to said surface, and changing the orientation of said crystal with respect to the rotational axis until the reflected light pattern rotates about its own center, the rotational axis of the crystal then coinciding with the optical axis.

2. The method of accurately determining the optical axis of a crystalline element which comprises approximately determining said optical axis by means of polarized light, forming upon said element a plane surface substantially perpendicular to said approximately determined optical axis, etching said plane surface, projecting a light beam upon said etched surface, receiving upon a second plane surface in substantially parallel spaced relation to said etched surface a light pattern determined by a characteristic of said etched surface, rotating said crystalline element about said approximately determined optical axis and observing the movement of said pattern upon said second surface, and changing the axis of rotation of said element to effect rotation of said pattern about its own center thereby to render the axis of rotation of said element coincident with its optical axis.

3. The method of accurately determining the optical axis of a piezoelectric crystal which comprises approximately determining said optical axis by means of polarized light, forming upon said crystal a plane surface substantially perpendicular to said approximately determined optical axis, etching said plane surface, projecting a light beam upon said crystal so that a beam projected substantially perpendicularly from said etched surface forms upon a second surface in substantially parallel spaced relation with said etched surface a light pattern comprising three distinct dots juxtaposed in accordance with a crystalline characteristic of said etched surface, rotating said crystal about said approximately determined optical axis to effect rotation of said pattern upon said second surface, and changing the rotational axis of said crystal to effect rotation of said pattern about its own center, the optical axis of said crystal thereupon coinciding with its rotational axis.

4. The method of accurately determining the optical axis of a crystalline element which comprises approximately determining said optical axis by means of polarized light, forming upon said element a plane surface substantially perpendicular to said approximately determined optical axis, etching said plane surface, reflecting a light beam substantially perpendicularly from said etched surface to form upon a second surface in substantially parallel spaced relation to said etched surface a light pattern determined in accordance with a characteristic of said etched surface, rotating said crystalline element about said approximately determined optical axis to effect rotation of said pattern upon said second surface, and changing the axis of rotation of said crystalline element to effect rotation of said pattern about its own center, the optical axis of said element thereupon coinciding with its rotational axis.

RAYMOND J. WATROBSKI.

REFERENCES CITED

The following references are of record in the file of this patent:

UNITED STATES PATENTS

| Number | Name | Date |
| --- | --- | --- |
| 1,799,604 | Read | Apr. 7, 1931 |
| 1,918,976 | Marrison | July 18, 1933 |
| 2,264,380 | Hawk | Dec. 2, 1941 |
| 2,218,489 | Gerber | Oct. 15, 1940 |